(12) United States Patent
Han et al.

(10) Patent No.: US 12,284,593 B2
(45) Date of Patent: Apr. 22, 2025

(54) DATA TRANSMISSION METHOD AND APPARATUS, AND STORAGE MEDIUM

(71) Applicant: ZTE Corporation, Shenzhen (CN)

(72) Inventors: Zhiqiang Han, Shenzhen (CN); Nan Li, Shenzhen (CN); Dan Yang, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 349 days.

(21) Appl. No.: 17/778,131

(22) PCT Filed: Jan. 5, 2021

(86) PCT No.: PCT/CN2021/070324
§ 371 (c)(1),
(2) Date: May 19, 2022

(87) PCT Pub. No.: WO2021/143581
PCT Pub. Date: Jul. 22, 2021

(65) Prior Publication Data
US 2022/0353790 A1 Nov. 3, 2022

(30) Foreign Application Priority Data
Jan. 13, 2020 (CN) .......................... 202010032746.6

(51) Int. Cl.
*H04W 4/00* (2018.01)
*H04W 48/08* (2009.01)
*H04W 74/08* (2009.01)

(52) U.S. Cl.
CPC ........... *H04W 48/08* (2013.01); *H04W 74/08* (2013.01)

(58) Field of Classification Search
CPC ..... H04W 48/08; H04W 74/08; H04W 76/15; H04W 76/11; H04W 72/23
See application file for complete search history.

(56) References Cited

U.S. PATENT DOCUMENTS

| | | | |
|---|---|---|---|
| 11,564,109 B2 * | 1/2023 | Chen | H04W 24/02 |
| 11,641,633 B1 * | 5/2023 | Cao | H04W 56/001 370/336 |

(Continued)

FOREIGN PATENT DOCUMENTS

| | | |
|---|---|---|
| CN | 103096440 A | 5/2013 |
| CN | 104168662 A | 11/2014 |
| WO | 2019153756 A1 | 8/2019 |

OTHER PUBLICATIONS

International Searching Authority. International Search Report and Written Opinion for PCT Application No. PCT/CN2021/070324 and English translation, mailed Mar. 25, 2021, pp. 1-9.

(Continued)

*Primary Examiner* — Abdelnabi O Musa
(74) *Attorney, Agent, or Firm* — Vivacqua Crane, PLLC

(57) ABSTRACT

A data transmission method and apparatus, and a non-transitory computer-readable storage medium are disclosed. The data transmission method may include: sending, by a first communication node, a radio frame comprising indication information to a second communication node, wherein the second communication node is associated with a third communication node, the third communication node and the first communication node perform joint transmission, and the indication information is configured to instruct a fourth communication node other than the second communication node, after receiving the radio frame, to determine whether to compete for channel access according to the indication information.

20 Claims, 9 Drawing Sheets

(56) References Cited

U.S. PATENT DOCUMENTS

| | | |
|---|---|---|
| 2015/0373685 A1 | 12/2015 | Seok |
| 2016/0135199 A1 | 5/2016 | Wang et al. |
| 2016/0309354 A1 | 10/2016 | Yerramalli et al. |
| 2020/0077351 A1* | 3/2020 | Porat .................. H04W 72/0446 |
| 2020/0305006 A1* | 9/2020 | Chen ..................... H04W 16/18 |
| 2020/0374870 A1 | 11/2020 | Guo et al. |
| 2021/0127291 A1* | 4/2021 | Chen .................. H04L 27/2603 |
| 2021/0307099 A1* | 9/2021 | Ryu ...................... H04W 76/15 |
| 2022/0104257 A1* | 3/2022 | Ryu ..................... H04W 74/0866 |
| 2022/0360367 A1* | 11/2022 | Aio ........................ H04B 7/024 |
| 2023/0328622 A1* | 10/2023 | Park ..................... H04W 16/28 |
| | | 370/328 |

OTHER PUBLICATIONS

European Patent Office. Extended European Search Report for EP Application No. 21740807.9, mailed Dec. 14, 2023, pp. 1-8.

* cited by examiner

[A first communication node sends a radio frame including indication information to a second communication node — Step 301

DATA TRANSMISSION METHOD AND APPARATUS, AND STORAGE MEDIUM

CROSS-REFERENCE TO RELATED APPLICATION

This application is a national stage filing under 35 U.S.C. § 371 of international application number PCT/CN2021/070324, filed on Jan. 5, 2021, which claims priority to Chinese patent application No. 202010032746.6 filed on Jan. 13, 2020. The contents of these applications are incorporated herein by reference in their entirety.

TECHNICAL FIELD

The present disclosure relates to radio communication networks, for example, to a data transmission method and apparatus, and a non-transitory computer-readable storage medium.

BACKGROUND

Currently, in the field of wireless networks, wireless local area networks (WLANs) are developing rapidly. Meanwhile, users' demand for coverage, quality of service, and throughput increases day by day. An access point (AP) and a plurality of stations (STA) associated with the AP form a basic service set (BSS). In order to provide more reliable and higher-speed service to users at the edge of coverage, a plurality of APs can perform joint transmission to one single STA simultaneously.

Assuming that AP1 and STA1 form a BSS and AP2 and STA2 form a BSS, in order to allow the station STA1 at the edge of coverage to better receive signals, AP1 and AP2 simultaneously transmit the same radio frame to STA1. In this case, STA2 associated with AP2, after receiving the radio frame sent by AP1 and AP2 to STA1, determines that the radio frame belongs to another BSS, and will compete for channel access and send another radio frame to AP2.

However, in the above process, because AP2 is assisting AP1 in joint transmission, AP2 cannot receive the radio frame transmitted by STA2. Besides, the radio frame transmitted by STA2 may interfere with the reception of the transmission of AP1 and AP2 by STA1.

SUMMARY

The following is a summary of the subject matter described in detail herein. This summary is not intended to limit the scope of protection of the claims.

The present disclosure provides a data transmission method and apparatus and a non-transitory computer-readable storage medium to deal with the technical problems of energy waste and communication interference caused by channel access competition among other communication nodes, after receiving a radio frame, than a target receiver of the radio frame in a current joint transmission scenario.

An embodiment of the present disclosure provides a data transmission method, which may include: sending, by a first communication node, a radio frame including indication information to a second communication node, where the second communication node is associated with a third communication node, the third communication node and the first communication node perform joint transmission, and the indication information is configured to instruct a fourth communication node other than the second communication node, after receiving the radio frame, to determine whether to compete for channel access according to the indication information.

An embodiment of the present disclosure provides a data transmission method, which may include: receiving, by a fourth communication node, a radio frame including indication information sent by a first communication node, where the first communication node and a third communication node perform joint transmission; and the fourth communication node determines whether to compete for channel access according to the indication information.

An embodiment of the present disclosure provides a data transmission apparatus, which may include: a processor for implementing any of the data transmission methods according to any of the above embodiments when executing a computer program.

An embodiment of the present disclosure provides a non-transitory computer-readable storage medium storing a computer program which, when executed by a processor, causes the processor to implement any of the data transmission methods according to any of the embodiments of the present disclosure.

The above embodiments and other aspects and the implementations thereof in the present disclosure are further described in the brief description of drawings, detailed description, and appended claims.

Other aspects may be apparent from reading and understanding the accompanying drawings and detailed description.

DETAILED DESCRIPTION

In order to make the purposes and technical schemes of the present disclosure clear, embodiments of the present disclosure will be described hereinafter in detail with reference to the accompanying drawings. It should be noted that any combinations of embodiments and features of the embodiments of the present disclosure without conflict are possible.

Figure 1:
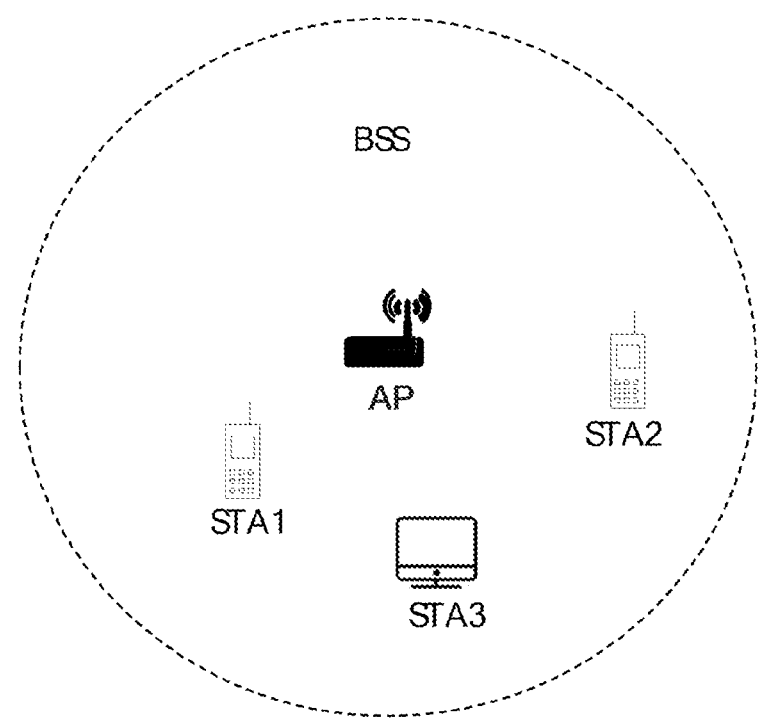
FIG. 1 is a schematic diagram of a BSS.

FIG. 1 is a schematic diagram of a BSS. As shown in FIG. 1, an AP and a plurality of STAs associated with the AP form a BSS. In FIG. 1, there are three STAs associated with the AP: STA1, STA2, and STA3.

Figure 2A:
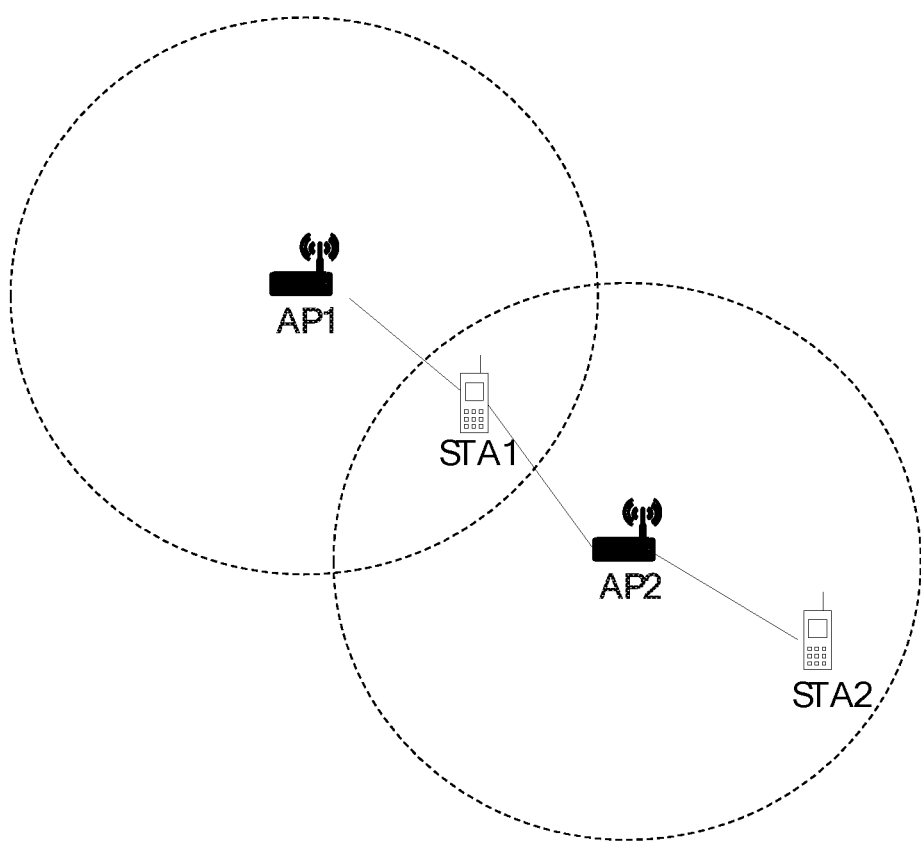
FIG. 2A is an architecture diagram of a current wireless network where joint transmission is performed.
Figure 2B:
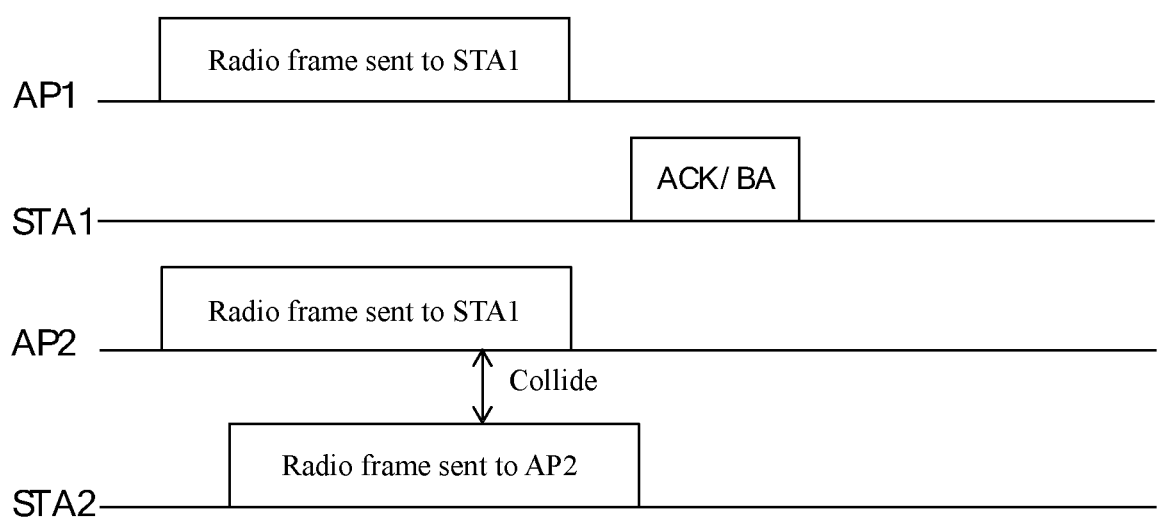
FIG. 2B is a schematic diagram of a current frame interaction sequence of joint transmission.

FIG. 2A is an architecture diagram of a current wireless network where joint transmission is performed. As shown in FIG. 2A, it is assumed that AP1 and STA1 form a BSS, and AP2 and STA2 form a BSS. AP1 and AP2 form a joint transmission group through negotiation or configuration. STA1 is in an overlapping coverage area of AP1 and AP2. Due to signal quality, network loads and other reasons, the reception quality of STA1 is unsatisfying. In order to provide better service to STA1, AP1 and AP2 can jointly transmit one and the same radio frame to STA1 on one and the same frequency band, so as to increase the gain of signals received by STA1, thereby improving the reception quality of STA1. However, in the above process, STA2 associated with AP2 can also receive the radio frame, and when determining that the radio frame belongs to another BSS, STA2 will compete for channel access and send another radio frame to AP2. FIG. 2B is a schematic diagram of a current frame interaction sequence of joint transmission. As shown in FIG. 2B, AP1 and AP2 simultaneously send a radio frame to STA1. After receiving the radio frame, STA1 sends acknowledge (ACK) information or block acknowledge (BA) information. After receiving the radio frame, STA2 may ignore the radio frame, compete for channel access, and send another radio frame to AP2. The radio frame sent by STA2 to AP2 will collide with the radio frame sent by AP2 to STA1. On the one hand, because AP2 is assisting AP1 in joint transmission, AP2 cannot receive the radio frame transmitted by STA2; and on the other hand, the radio frame transmitted by STA2 may interfere with the reception of the transmission of AP1 and AP2 by STA1. This leads to both energy waste of STA2 and interference with signal reception of STA1.

The present disclosure provides a data transmission method, in which a first communication node sends a radio frame including indication information to a second communication node, and in a scenario of joint transmission by the first communication node and a third communication node, a fourth communication node other than the second communication node determines whether to compete for channel access according to the indication information after receiving the radio frame, so as to save the energy of the fourth communication node, avoid interfering with the reception of the radio frame by the second communication node, and improve the communication reliability of the second communication node.

Figures 3, 4:
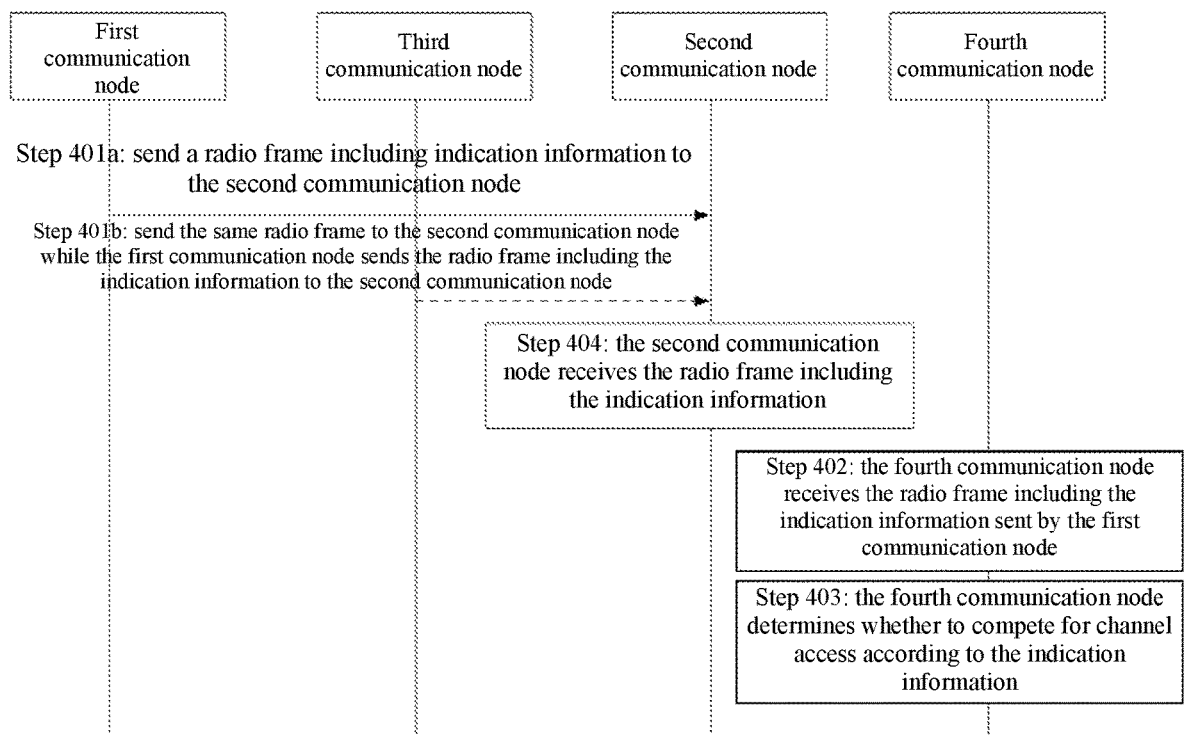
FIG. 3 is a flowchart of a data transmission method provided by an embodiment.
FIG. 4 is a signaling interaction diagram of a data transmission method provided by an embodiment.

FIG. 3 is a flowchart of a data transmission method provided by an embodiment. As shown in FIG. 3, the data transmission method provided by this embodiment includes the following steps.

At step 301, a first communication node sends a radio frame including indication information to a second communication node.

Here, the second communication node is associated with a third communication node. The third communication node and the first communication node perform joint transmission. The indication information is configured to instruct a fourth communication node other than the second communication node, after receiving the radio frame, to determine whether to compete for channel access according to the indication information.

In an embodiment, joint transmission means that the first communication node and the third communication node simultaneously send the radio frame to the second communication node.

In another embodiment, joint transmission means that the first communication node alone sends the radio frame to the second communication node.

In yet another embodiment, joint transmission means that the third communication node alone sends the radio frame to the second communication node.

FIG. 4 is a signaling interaction diagram of a data transmission method provided by an embodiment. As shown in FIG. 4, the data transmission method provided by this embodiment includes the following steps.

At step 401a, a first communication node sends a radio frame including indication information to a second communication node.

At step 402, a fourth communication node receives the radio frame including the indication information sent by the first communication node.

At step 403, the fourth communication node determines whether to compete for channel access according to the indication information.

At step 404, The second communication node receives the radio frame including the indication information.

In an implementation, the method may further include: At step 401b, while the first communication node sends the radio frame including the indication information to the second communication node, a third communication node sends the same radio frame to the second communication node.

The communication nodes in this embodiment are all devices working in unlicensed frequency bands, and basically all these devices adopt the Listen Before Talk (LBT) mechanism. In order to realize transmission in unlicensed frequency bands, the devices first listen to a wireless medium for a while.

In this embodiment, the first communication node and the third communication node may be APs, and the second communication node and the fourth communication node may be STAs. The second communication node is a target receiver of the radio frame including the indication information. The third communication node is associated with the second communication node, that is, the third communication node and the second communication node form a BSS. The fourth communication node is located in a coverage area of the first communication node. Because the fourth communication node is located in the coverage area of the first communication node, the fourth communication node can receive the radio frame sent by the first communication node to the second communication node. The fourth communication node may have the following relationships with the first communication node and the third communication node: the fourth communication node is associated with the first communication node; the fourth communication node is associated with the third communication node, but is not the target receiver of the radio frame including the indication information; or the fourth communication node is associated with neither the first communication node nor the third communication node. In this embodiment, the indication information can be implemented in the following two ways. Based on different implementations of the indication information and different relationships between the fourth communication node and the first communication node and the third communication node, after receiving the radio frame including the indication information, the fourth communication node can determine whether to compete for channel access in different ways.

The implementations of the indication information and how the fourth communication node determines whether to compete for channel access according to the indication information will be described in detail below.

In an implementation, the indication information includes first identifier information. In an implementation, the first identifier information is configured to indicate whether the radio frame is a joint transmission radio frame. Alternatively, the first identifier information is configured to indicate an identifier of the first communication node. Alternatively, the first identifier information is configured to indicate an identifier of joint transmission. In an implementation, the first identifier information is located at a physical frame header of the radio frame. For example, the first identifier information may be located at a first preset position of the physical frame header of the radio frame.

In this implementation, in the case that the first identifier information is configured to indicate whether the radio frame is a joint transmission radio frame, the first identifier information being a first preset value means that the radio frame is a joint transmission radio frame; and the first identifier information being a second preset value means that the radio frame is not a joint transmission radio frame.

In response to determining that the first identifier information indicates that the radio frame is a joint transmission radio frame, the fourth communication node does not compete for channel access after receiving the indication information.

In this case, regardless of the relationship between the fourth communication node and the first communication node and the third communication node, as long as the fourth communication node can receive the radio frame and is not the target receiver of the radio frame, after receiving the radio frame, the fourth communication node acquires the first identifier information from the first preset position of the physical frame header of the radio frame, and determines that the radio frame is a joint transmission radio frame when the first identifier information is determined to be the first preset value. In order to save energy and avoid interfering with the reception of the radio frame by the second communication node, the fourth communication node does not compete for channel access.

In this implementation, in the case that the first identifier information is configured to indicate the identifier of the first communication node, the first identifier information is at least one of the following: a color of a BSS where the first communication node is located (BSS Color), an identifier of the BSS where the first communication node is located, a value generated according to the identifier of the BSS where the first communication node is located, an identifier of the first communication node itself, or a value generated according to the identifier of the first communication node itself. In this case, the first identifier information is equivalent to indicating an identifier of a communication node assisting in joint transmission.

Here, the identifier of the first communication node itself may be a media access control (MAC) address of the first communication node, or a value generated according to the MAC address of the first communication node.

In the case that the first identifier information is configured to indicate the identifier of the first communication node, the fourth communication node determining whether to compete for channel access according to the indication information has the following three situations.

Situation A: In response to the fourth communication node being a communication node associated with the first communication node, the fourth communication node does not compete for channel access after receiving the indication information.

In this case, after receiving the radio frame, the fourth communication node acquires the first identifier information from the first preset position of the physical frame header of the radio frame. In response to determining that a communication node associated with the fourth communication node, that is, the first communication node, participates in joint transmission according to the first identifier information, the fourth communication node does not compete for channel access in order to save energy and avoid interfering with the reception of the radio frame by the second communication node.

Situation B: In response to the fourth communication node being a communication node associated with the third communication node, and the fourth communication node being not the target receiver of the radio frame, the fourth communication node does not compete for channel access after receiving the indication information.

In this case, after receiving the radio frame, the fourth communication node acquires the first identifier information from the first preset position of the physical frame header of the radio frame. In response to determining that a communication node associated with the fourth communication node, that is, the third communication node, participates in joint transmission according to the first identifier information, in an implementation, the fourth communication node can determine that the fourth communication node is not the target receiver of the radio frame according to other identifier information in the indication information, for example, second identifier information indicating the target receiver, so in order to save energy and avoid interfering with the reception of the radio frame by the second communication node, the fourth communication node does not compete for channel access.

Situation C: In response to the fourth communication node being a communication node associated with neither the first communication node nor the third communication node, the fourth communication node competes for channel access after receiving the indication information.

In this case, after receiving the radio frame, the fourth communication node acquires the first identifier information from the first preset position of the physical frame header of the radio frame. In response to determining that a communication node associated with the fourth communication node does not participate in joint transmission according to the first identifier information, the fourth communication node may discard the radio frame and compete for channel access by using technologies such as spatial multiplexing for data transmission. In this case, on the one hand, because the communication node associated with the fourth communication node does not participate in joint transmission, the data sent by the fourth communication node after competing for channel access can be received by the communication node associated with the fourth communication node; and on the other hand, the data sent by the fourth communication node after competing for channel access will not affect the reception of the radio frame by the second communication node. Therefore, in this case, the fourth communication node can compete for channel access.

In an implementation, in response to determining that a communication node associated with the fourth communication node does not participate in joint transmission according to the first identifier information, the fourth communication node competes for channel access when other preset conditions are met.

In this implementation, in the case that the first identifier information is configured to indicate the identifier of joint transmission, the first identifier information is an exclusive identifier of joint transmission. Alternatively, the first identifier information is an identifier of a joint transmission group. For example, AP1, AP2, and AP3 form a joint transmission group through negotiation or configuration, and the joint transmission group has an identifier, which may be the exclusive identifier of joint transmission or the identifier of the joint transmission group. Assuming that the identifier is E, then during joint transmission of AP1 and AP2, the radio frame carries the identifier E, or a value generated according to the identifier E; during joint transmission of AP2 and AP3, the radio frame also carries the identifier E (or a value generated according to the identifier E); and during joint transmission of AP1 and AP3, the radio frame also carries the identifier E (or a value generated according to the identifier E).

In the case that the first identifier information is configured to indicate the identifier of joint transmission, in response to the fourth communication node being a communication node associated with a communication node included in the identifier of joint transmission, the fourth communication node does not compete for channel access after receiving the indication information. In response to the fourth communication node being a communication node not associated with the communication node included in the identifier of joint transmission, the fourth communication node competes for channel access after receiving the indication information.

In this case, after receiving the radio frame, the fourth communication node acquires the first identifier information from the first preset position of the physical frame header of the radio frame. After acquiring the first identifier information, the fourth communication node can know a communication node corresponding to the identifier of joint transmission, which can also be called a communication node included in the identifier of joint transmission. Assuming that the identifier of joint transmission is E, it can be determined that the communication nodes included in the identifier of joint transmission are AP1, AP2 and AP3. In response to determining that a joint transmission group where a communication node associated with the fourth communication node is located participates in joint transmission according to the first identifier information, the fourth communication node does not compete for channel access in order to save energy and avoid interfering with the reception of the radio frame by the second communication node. In response to determining that a joint transmission group where a communication node associated with the fourth communication node is located does not participate in joint transmission according to the first identifier information, the fourth communication node can compete for channel access. In an implementation, in response to determining that a joint transmission group where a communication node associated with the fourth communication node is located does not participate in joint transmission according to the first identifier information, the fourth communication node competes for channel access when other preset conditions are met.

It should be noted that assuming that the fourth communication node is a communication node associated with AP3, then the communication nodes actually participating in joint transmission are AP1 and AP2, and the communication nodes included in the identifier of joint transmission are AP1, AP2 and AP3. In response to determining that a joint transmission group where a communication node associated with the fourth communication node is located participates in joint transmission according to the first identifier information, the fourth communication node does not compete for channel access.

By way of example, the fourth communication node updates a network allocation vector (NAV) after determining that a joint transmission group where a communication node associated with the fourth communication node is located participates in joint transmission.

In an implementation, in order to further save power, the fourth communication node enters a sleep mode after determining not to compete for channel access.

In an implementation, a sleep duration of the fourth communication node is: a duration of the radio frame or a time period indicated in the radio frame.

In an implementation, the indication information also includes second identifier information besides the first identifier information, and the second identifier information is configured to indicate an identifier of the third communication node and/or an identifier of the target receiver. In an implementation, the second identifier information is located at the physical frame header of the radio frame. For example, the second identifier information may be located at a second preset position of the physical frame header of the radio frame.

In an implementation, the second identifier information includes at least one of the following: a color of a BSS where the third communication node is located, an identifier of the BSS where the third communication node is located, a value generated according to the identifier of the BSS where the third communication node is located, an identifier of the third communication node itself, or a value generated according to the identifier of the third communication node itself.

Here, the identifier of the third communication node itself includes at least one of the following: an MAC address of the third communication node, or a value generated according to the MAC address of the third communication node.

In this implementation, in the case that the second identifier information indicates the identifier of the third communication node, the second communication node and the fourth communication node can determine whether the radio frame belongs to communication nodes associated thereto according to the second identifier information. In response to determining that the radio frame belongs to the associated communication nodes, the second communication node and the fourth communication node determine that the second communication node and the fourth communication node may be the target receiver of the radio frame. In response to determining that the radio frame does not belong to the associated communication nodes, the second communication node and the fourth communication node determine that the second communication node and the fourth communication node are not the target receiver of the radio frame. In the case that the second identifier information indicates the target receiver, or the second identifier information indicates the identifier of the third communication node and the identifier of the target receiver, the second communication node and the fourth communication node can determine whether the second communication node and the fourth communication node are the target receivers of the radio frame according to the second identifier information. In the case that the second identifier information indicates the identifier of the third communication node, the second identifier information is equivalent to indicating an attribution of the radio frame.

In this implementation, after receiving the radio frame, the second communication node acquires the first identifier information from the first preset position and the second identifier information from the second preset position. In the case that the second identifier information indicates the identifier of the third communication node, the second communication node determines that the radio frame belongs to communication nodes associated with the second communication node according to the second identifier information. In an implementation, the second communication node can also determine that the radio frame belongs to the second communication node according to other indication information, such as uplink and downlink indications, and performs subsequent reception. In the case that the second identifier information indicates the target receiver, or the second identifier information indicates the identifier of the third communication node and the identifier of the target receiver, the second communication node determines that the second communication node itself is the target receiver of the radio frame and performs subsequent reception.

In this implementation, after receiving the radio frame, the fourth communication node acquires the first identifier information from the first preset position and the second identifier information from the second preset position. In the case that the second identifier information indicates the identifier of the third communication node, the fourth communication node determines that the radio frame does not belong to communication nodes associated with the fourth communication node according to the second identifier information, indicating that the fourth communication node is not the target receiver of the radio frame. In the case that the second identifier information indicates the target receiver, or the second identifier information indicates the identifier of the third communication node and the identifier of the target receiver, the fourth communication node determines that the fourth communication node itself is not the target receiver of the radio frame. Then the fourth communication node determines whether to compete for channel access according to the first identifier information.

In the case that the first identifier information is configured to indicate whether the radio frame is a joint transmission radio frame, assuming that it is determined that the radio frame is a joint transmission radio frame according to the first identifier information, and the fourth communication node does not compete for channel access, that is, the fourth communication node can determine that joint transmission is currently under way, in order to avoid interfering with the reception of the radio frame by the second communication node, the fourth communication node does not compete for channel access.

In the case that the first identifier information is configured to indicate the identifier of the first communication node, assuming that the fourth communication node determines that a communication node associated with the fourth communication node participates in joint transmission according to the first identifier information, the fourth communication node does not compete for channel access in order to save energy and avoid interfering with the reception of the radio frame by the second communication node. That is, although a communication node associated with the fourth communication node participates in joint transmission, the radio frame does not belong to communication nodes associated with the fourth communication node, and the fourth communication node itself is not the target receiver of the radio frame, so the fourth communication node does not compete for channel access in order to save power and avoid interfering with the reception of the radio frame by the second communication node.

In the case that the first identifier information is configured to indicate the identifier of joint transmission, assuming that the fourth communication node determines that a joint transmission group where a communication node associated with the fourth communication node is located participates in joint transmission according to the first identifier information, the fourth communication node does not compete for channel access in order to save energy and avoid interfering with the reception of the radio frame by the second communication node. That is, although a communication node associated with the fourth communication node may participate in joint transmission, the radio frame does not belong to communication nodes associated with the fourth communication node, and the fourth communication node itself is not the target receiver of the radio frame, so the fourth communication node does not compete for channel access in order to save power and avoid interfering with the reception of the radio frame by the second communication node.

It should be noted that the indication information in this embodiment may also be identifier information including the first identifier information and the second identifier information described above, for example, the indication information may be a value generated according to the first identifier information and the second identifier information. Accordingly, after receiving the radio frame, the fourth communication node can deduce the first identifier information and the second identifier information according to the identifier information.

The data transmission method provided by this embodiment is described in detail below through example application scenarios.

Figure 5A:
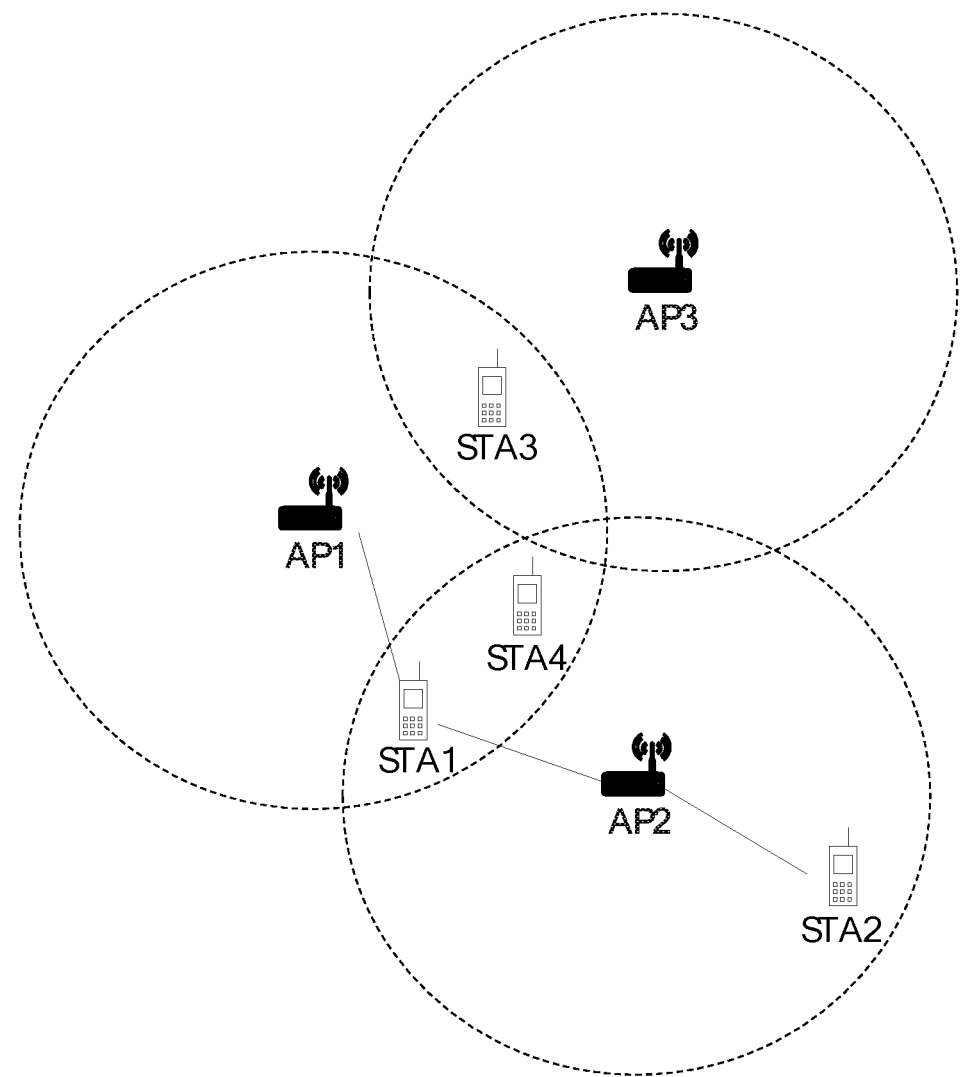
FIG. 5A is a schematic diagram of an application scenario of a data transmission method provided by an embodiment.

FIG. 5A is a schematic diagram of an application scenario of a data transmission method provided by an embodiment. The data transmission method of this embodiment will be explained in detail by taking AP2 as a first communication node, STA1 as a second communication node, AP1 as a third communication node and STA2, STA4 or STA3 as a fourth communication node. As shown in FIG. 5A, STA1 and AP1 form a BSS, STA2, STA4 and AP2 form a BSS, and STA3 and AP3 form a BSS. AP1 and AP2 form a joint transmission group through negotiation or configuration.

In order to provide better service to STA1 at the edge of coverage of AP1, AP1 and AP2 simultaneously transmit one and the same radio frame to STA1 on one and the same frequency band. Indication information needs to be carried in a physical frame header of the radio frame transmitted by AP1 and AP2. The indication information includes first identifier information. In an implementation, second identifier information may also be included. In an implementation, the first identifier information is configured to indicate whether the radio frame is a joint transmission radio frame. Alternatively, the first identifier information is configured to indicate an identifier of the first communication node. Alternatively, the first identifier information is configured to indicate an identifier of joint transmission. The second identifier information is configured to indicate an identifier of the third communication node and/or an identifier of a target receiver. By way of example, the second identifier information may be a color of a BSS where AP1 is located, which is denoted as BSS color1. The first identifier information may be a color of a BSS where AP2 is located, which is denoted as BSS color2.

After receiving the radio frame, STA1 determines that the radio frame belongs to an AP associated therewith through the second identifier information, namely BSS color1 information. STA1 can also determine that the radio frame belongs to STA1 according to other indication information, such as uplink and downlink indication and identifier information of STA1, and performs subsequent reception.

Originally, the radio frame sent by AP1 alone cannot be received correctly by STA2 and STA4. However, because AP1 and AP2 perform joint transmission, that is, AP2 also transmits the same radio frame, STA2 and STA4 can receive the above radio frame. After receiving the radio frame, STA2 and STA4 determine that the radio frame does not belong to APs associated therewith according to the second identifier information, namely BSS color1, and that AP2 associated therewith participates in joint transmission of the radio frame according to the first identifier information, namely BSS color2. STA2 and STA4 do not actively compete for channel access by using technologies such as spatial multiplexing during the transmission of the radio frame. In an implementation, STA2 and STA4 can enter a sleep mode within a duration of the radio frame.

In an implementation, even if AP2 does not perform joint transmission with AP1 due to channel conditions or other reasons, AP2 does not actively compete for channel access during the period when AP1 needs joint transmission. AP2 can know a duration of the joint transmission through information interaction between AP1 and AP2 or notification of a central control unit. Therefore, even if AP2 does not transmit anything in joint transmission, a station located in an overlapping coverage area of AP1 and AP2 and associated with AP2, such as STA4, as shown in FIG. 5A, determines that the radio frame does not belong to an AP associated therewith according to the first identifier information and the second identifier information, and that an associated AP (namely AP2) participates in joint transmission. STA4 enters a sleep mode without negotiating with the associated AP (namely AP2), and a duration of sleep is the duration of joint transmission indicated by the radio frame. If the radio frame does not explicitly indicate the duration of joint transmission, the duration of sleep is the duration of the radio frame.

Because STA3 is within a coverage area of AP1, STA3 can also receive the radio frame. After receiving the radio frame, STA3 determines that the radio frame does not belong to an AP associated therewith according to the second identifier information, namely BSS color1, and that AP3 associated therewith does not participate in joint transmission of the radio frame according to the first identifier information, namely BSS color2. STA3 can discard the radio frame and compete for channel access by using technologies such as spatial multiplexing.

Figure 6:
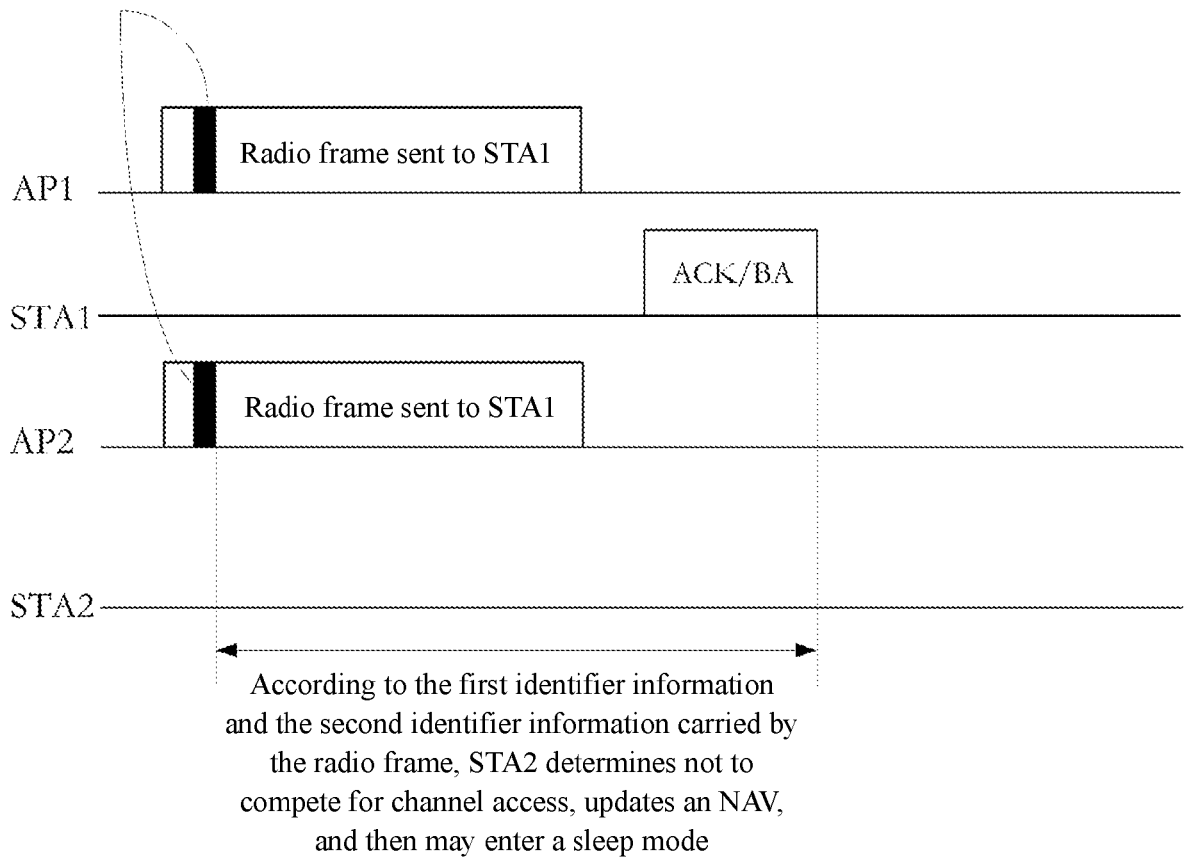
FIG. 6 is a schematic diagram of a frame interaction sequence of a data transmission method provided by an embodiment.

FIG. 6 is a schematic diagram of a frame interaction sequence of a data transmission method provided by an embodiment. As shown in FIGS. 6, AP1 and AP2 simultaneously send a radio frame including first identifier information and second identifier information to STA1. After receiving the radio frame, STA1 replies with ACK information or BA information. According to the first identifier information and the second identifier information carried by the radio frame, STA2 determines not to compete for channel access, updates an NAV, and then may enter a sleep mode.

Figure 5B:
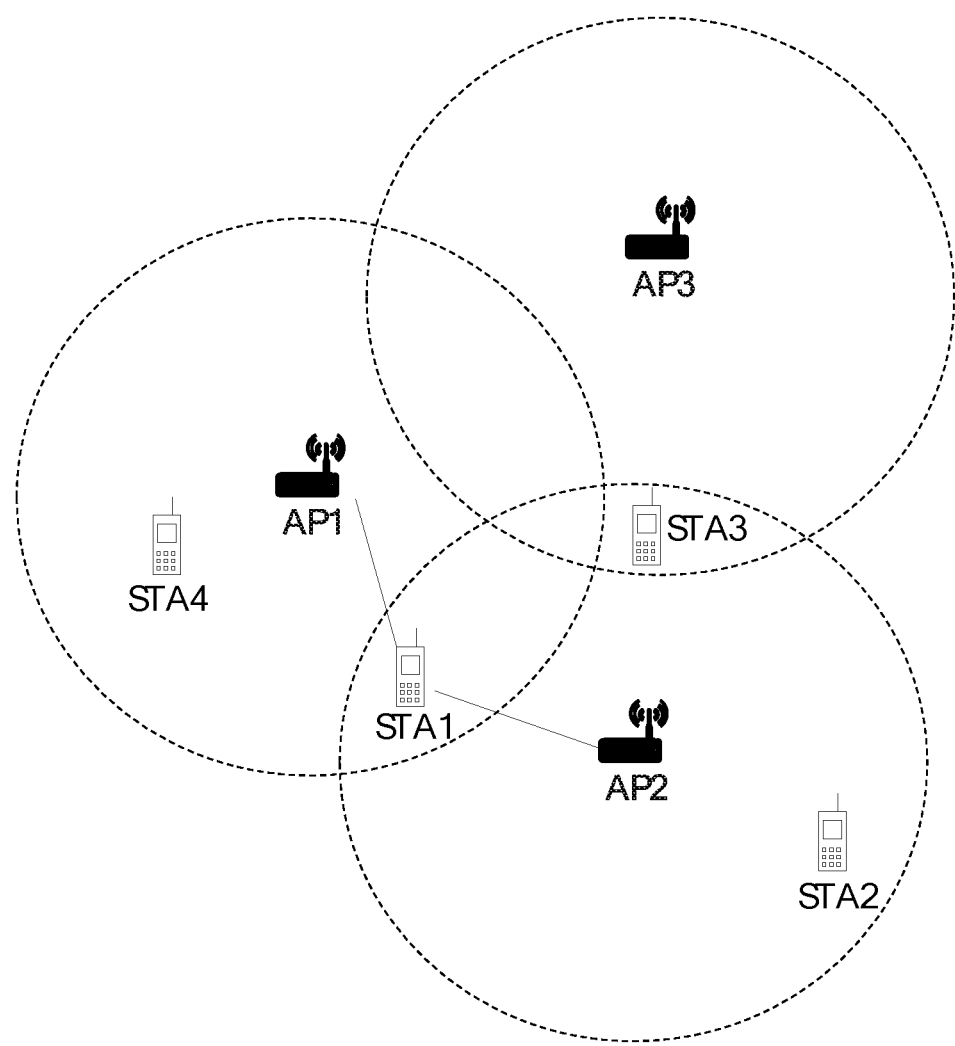
FIG. 5B is a schematic diagram of another application scenario of a data transmission method provided by an embodiment.

FIG. 5B is a schematic diagram of another application scenario of a data transmission method provided by an embodiment. The data transmission method of this embodiment will be explained in detail by taking AP2 as a first communication node, STA1 as a second communication node, AP1 as a third communication node and STA2, STA4 or STA3 as a fourth communication node. As shown in FIG. 5B, STA1, STA4 and AP1 form a BSS, STA2 and AP2 form a BSS, and STA3 and AP3 form a BSS. AP1 and AP2 form a joint transmission group through negotiation or configuration.

In order to provide better service to STA1 at the edge of coverage of AP1, AP1 and AP2 simultaneously transmit one and the same radio frame to STA1 on one and the same frequency band. Indication information needs to be carried in a physical frame header of the radio frame transmitted by AP1 and AP2. The indication information includes first identifier information. In an implementation, second identifier information may also be included. In an implementation, the first identifier information is configured to indicate whether the radio frame is a joint transmission radio frame. Alternatively, the first identifier information is configured to indicate an identifier of the first communication node. Alternatively, the first identifier information is configured to indicate an identifier of joint transmission. The second identifier information is configured to indicate an identifier of the third communication node and/or an identifier of a target receiver. By way of example, the second identifier information may be an identifier of a BSS where AP1 is located or a value generated according to the identifier of the BSS where AP1 is located. The first identifier information is configured to indicate whether the radio frame is a joint transmission radio frame.

After receiving the radio frame, STA1 determines that the radio frame belongs to an AP associated therewith through the second identifier information, namely BSS color1 information. STA1 can also determine that the radio frame belongs to STA1 according to other indication information, such as uplink and downlink indication and identifier information of STA1, and performs subsequent reception.

Originally, the radio frame sent by AP1 alone cannot be received correctly by STA2. However, because AP1 and AP2 perform joint transmission, that is, AP2 also transmits the same radio frame, STA2 can receive the above radio frame. After receiving the radio frame, STA2 determines that the radio frame does not belong to an AP associated therewith according to the second identifier information, and that the radio frame is a joint transmission radio frame according to the first identifier information. STA2 does not actively compete for channel access by using technologies such as spatial multiplexing during the transmission of the radio frame. In an implementation, STA2 can enter a sleep mode within a duration of the radio frame.

Because STA3 is within a coverage area of AP1, STA3 can also receive the radio frame. After receiving the radio frame, STA3 determines that the radio frame does not belong to an AP associated therewith according to the second identifier information, and that the radio frame is a joint transmission radio frame according to the first identification information. STA3 does not actively compete for channel access by using technologies such as spatial multiplexing during the transmission of the radio frame. In an implementation, STA3 can enter a sleep mode within a duration of the radio frame.

STA4 can also receive the radio frame. After receiving the radio frame, STA4 determines that the radio frame belongs to an AP associated therewith according to the second identifier information, and that the radio frame is a joint transmission radio frame according to the first identification information. STA4 can also determine that the radio frame does not belong to STA4 according to other indication information. STA4 does not actively compete for channel access by using technologies such as spatial multiplexing during the transmission of the radio frame. In an implementation, STA4 can enter a sleep mode within a duration of the radio frame.

Figure 5C:
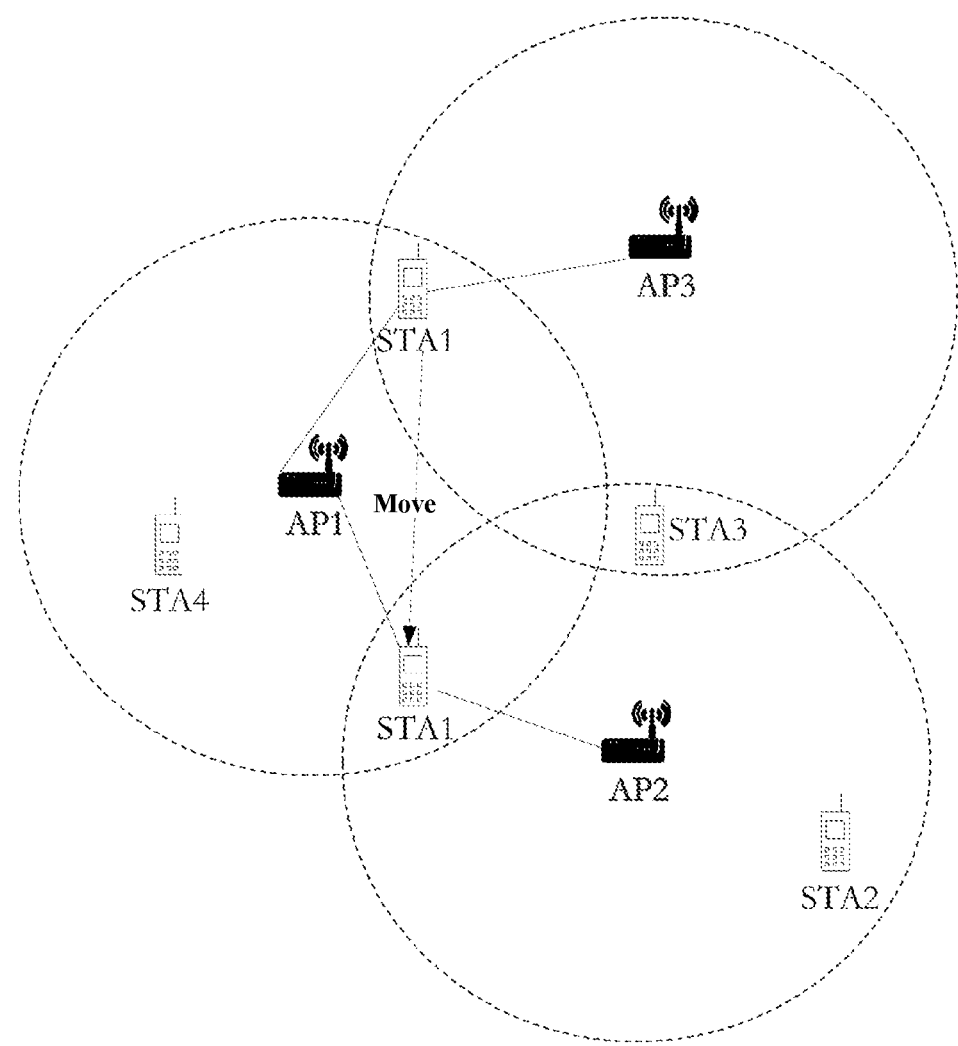
FIG. 5C is a schematic diagram of another application scenario of a data transmission method provided by an embodiment.

FIG. 5C is a schematic diagram of another application scenario of a data transmission method provided by an embodiment. The data transmission method of this embodiment will be explained in detail by taking AP2 or AP3 as a first communication node, STA1 as a second communication node, AP1 as a third communication node and STA2, STA4 or STA3 as a fourth communication node. As shown in FIG. 5C, STA1, STA4 and AP1 form a BSS, STA2 and AP2 form a BSS, and STA3 and AP3 form a BSS. AP1, AP2 and AP3 form a joint transmission group through negotiation or configuration. The joint transmission group has an exclusive identifier of joint transmission or an identifier of the joint transmission group.

Originally, STA1 is in an overlapping coverage area of AP1 and AP3. Due to signal quality, network loads and other reasons, the reception quality of STA1 is unsatisfying. In order to provide better service to STA1, AP1 and AP3 perform joint transmission. AP1 and AP3 simultaneously transmit one and the same radio frame to STA1 on one and the same frequency band. Indication information needs to be carried in a physical frame header of the radio frame transmitted by AP1 and AP3. The indication information includes first identifier information. In an implementation, second identifier information may also be included. In an implementation, the first identifier information is configured to indicate whether the radio frame is a joint transmission radio frame. Alternatively, the first identifier information is configured to indicate an identifier of the first communication node. Alternatively, the first identifier information is configured to indicate an identifier of joint transmission. The second identifier information is configured to indicate an identifier of the third communication node and/or an identifier of a target receiver. By way of example, the second identifier information may be an MAC address of AP1 or a value generated according to the MAC address of AP1. The first identifier information may be an identifier of the joint transmission group formed by AP1, AP2 and AP3.

After receiving the radio frame, STA1 determines that the radio frame belongs to an AP associated therewith through the second identifier information, namely BSS color1 information. STA1 can also determine that the radio frame belongs to STA1 according to other indication information, such as uplink and downlink indication and identifier information of STA1, and performs subsequent reception.

After receiving the radio frame, STA2 determines that the radio frame does not belong to an AP associated therewith according to the second identifier information, and that a joint transmission group where the AP associated therewith is located participates in the joint transmission according to the first identifier information. STA2 does not actively compete for channel access by using technologies such as spatial multiplexing during the transmission of the radio frame.

After receiving the radio frame, STA3 determines that the radio frame does not belong to an AP associated therewith according to the second identifier information, and that a joint transmission group where the AP associated therewith is located participates in the joint transmission according to the first identifier information. STA3 does not actively compete for channel access by using technologies such as spatial multiplexing during the transmission of the radio frame.

After receiving the radio frame, STA4 determines that the radio frame belongs to an AP associated therewith according to the second identifier information, and that a joint transmission group where the AP associated therewith is located participates in the joint transmission according to the first identifier information. STA4 can also determine that the radio frame does not belong to STA4 according to other indication information. STA4 does not actively compete for channel access by using technologies such as spatial multiplexing during the transmission of the radio frame. In an implementation, STA4 can enter a sleep mode within a duration of the radio frame.

When STA1 moves, STA1 moves from an overlapping area of AP1 and AP3 to an overlapping area of AP1 and AP2. In this case, AP1 chooses AP2 for joint transmission. AP1 and AP2 simultaneously transmit one and the same radio frame to STA1 on one and the same frequency band. Indication information needs to be carried in a physical frame header of the radio frame transmitted by AP1 and AP2. The indication information includes first identifier information. In an implementation, second identifier information may also be included. In an implementation, the first identifier information is configured to indicate whether the radio frame is a joint transmission radio frame. Alternatively, the first identifier information is configured to indicate an identifier of the first communication node. Alternatively, the first identifier information is configured to indicate an identifier of joint transmission. The second identifier information is configured to indicate an identifier of the third communication node and/or an identifier of a target receiver. By way of example, the second identifier information may be an MAC address of AP1 or a value generated according to the MAC address of AP1. The first identifier information may be an identifier of the joint transmission group formed by AP1, AP2 and AP3.

After receiving the radio frame, STA1 determines that the radio frame belongs to an AP associated therewith through the second identifier information, namely BSS color1 information. STA1 can also determine that the radio frame belongs to STA1 according to other indication information, such as uplink and downlink indication and identifier information of STA1, and performs subsequent reception.

After receiving the radio frame, STA2 and STA3 determine that the radio frame does not belong to an AP associated therewith according to the second identifier information, and that a joint transmission group where the AP associated therewith is located participates in the joint transmission according to the first identifier information. STA2 and STA3 do not actively compete for channel access by using technologies such as spatial multiplexing during the transmission of the radio frame.

After receiving the radio frame, STA4 determines that the radio frame belongs to an AP associated therewith according to the second identifier information, and that a joint transmission group where the AP associated therewith is located participates in the joint transmission according to the first identifier information. STA4 can also determine that the radio frame does not belong to STA4 according to other indication information. STA4 does not actively compete for channel access by using technologies such as spatial multiplexing during the transmission of the radio frame. In an implementation, STA4 can enter a sleep mode within a duration of the radio frame.

Figure 5D:
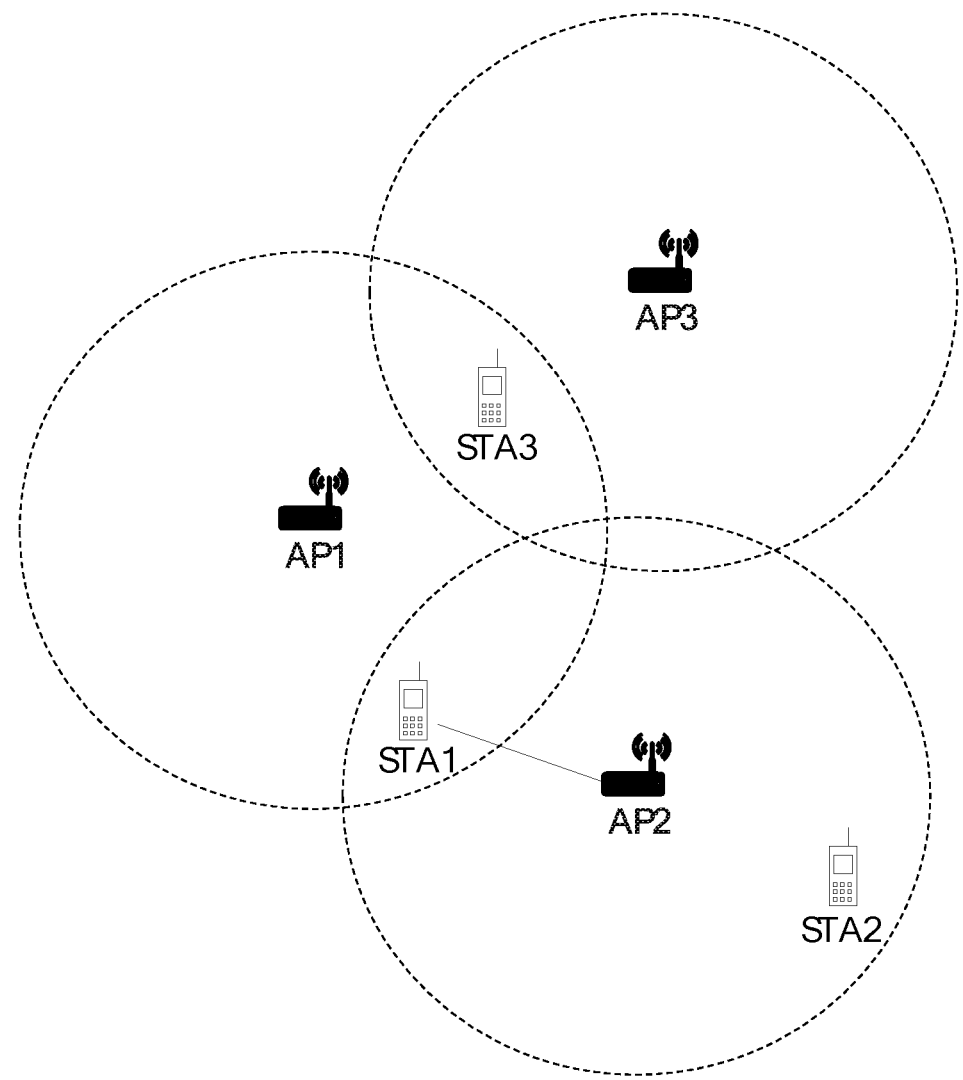
FIG. 5D is a schematic diagram of another application scenario of a data transmission method provided by an embodiment.

FIG. 5D is a schematic diagram of another application scenario of a data transmission method provided by an embodiment. The data transmission method of this embodiment will be explained in detail by taking AP2 as a first communication node, STA1 as a second communication node, AP1 as a third communication node and STA2 or STA3 as a fourth communication node. As shown in FIG. 5D, STA1 and AP1 form a BSS, STA2 and AP2 form a BSS, and STA3 and AP3 form a BSS. AP1 and AP2 form a joint transmission group through negotiation or configuration.

In some scenarios, for example, when the station is moving, STA1 moves from a position close to AP1 to a position close to AP2, in order to provide better service to STA1, AP1 chooses AP2 to transmit data to STA1. In this case, AP1 does not transmit data to STA1.

AP2 competes for channel access to transmit a radio frame to STA1. In order to avoid interference, indication information needs to be carried in a physical frame header of the radio frame transmitted by AP2. The indication information includes first identifier information. In an implementation, second identifier information may also be included. In an implementation, the first identifier information is configured to indicate whether the radio frame is a joint transmission radio frame. Alternatively, the first identifier information is configured to indicate an identifier of the first communication node. Alternatively, the first identifier information is configured to indicate an identifier of joint transmission. The second identifier information is configured to indicate an identifier of the third communication node and/or an identifier of a target receiver. By way of example, the second identifier information may be a color of a BSS where AP1 is located. The first identifier information may be an identifier of AP2.

After receiving the radio frame, STA1 determines that the radio frame belongs to an AP associated therewith according to the second identifier information. STA1 can also determine that the radio frame belongs to STA1 according to other indication information, such as uplink and downlink indication and identifier information of STA1, and performs subsequent reception.

After receiving the radio frame, STA2 determines that the radio frame does not belong to an AP associated therewith according to the second identifier information, and that AP2 associated therewith participates in joint transmission of the radio frame according to the first identifier information. STA2 does not actively compete for channel access by using technologies such as spatial multiplexing during the transmission of the radio frame. In an implementation, STA2 can enter a sleep mode within a duration of the radio frame.

After receiving the radio frame, STA3 determines that the radio frame does not belong to an AP associated therewith according to the second identifier information, and that AP3 associated therewith does not participate in joint transmission of the radio frame according to the first identifier information. STA3 can discard the radio frame and compete for channel access by using technologies such as spatial multiplexing.

The data transmission method provided by this embodiment includes: sending, by a first communication node, a radio frame including indication information to a second communication node, where the second communication node is associated with a third communication node, the third communication node and the first communication node perform joint transmission, and the indication information is configured to indicate whether a fourth communication node other than the second communication node determines to compete for channel access according to the indication information after receiving the radio frame. The first communication node sends the radio frame including the indication information to the second communication node, and in the scenario of joint transmission by the first communication node and the third communication node, the fourth communication node other than the second communication node determines whether to compete for channel access according to the indication information after receiving the radio frame, so as to save the energy of the fourth communication node, avoid interfering with the reception of the radio frame by the second communication node, and improve the communication reliability of the second communication node.

Figure 7:
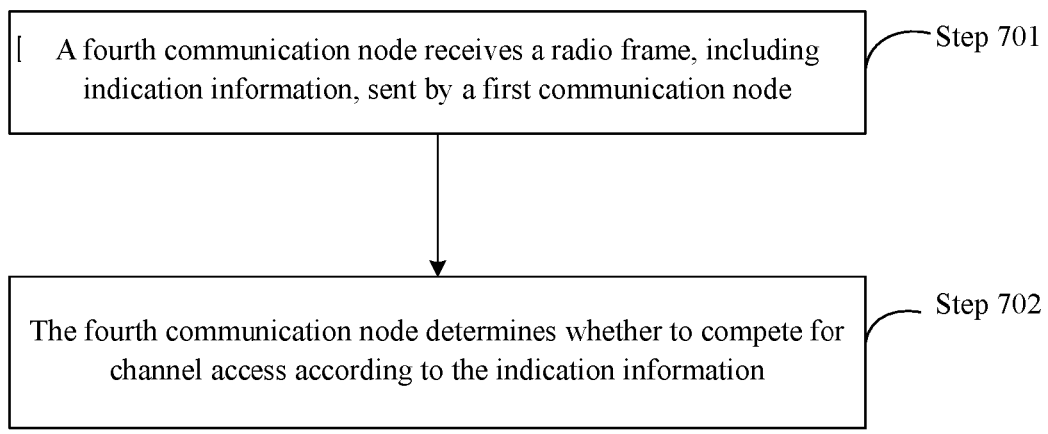
FIG. 7 is a flowchart of a data transmission method provided by another embodiment.

FIG. 7 is a flowchart of a data transmission method provided by another embodiment. In this embodiment, the data transmission method provided by this embodiment is explained in detail by taking a fourth communication node as an execution subject. As shown in FIG. 7, the data transmission method provided by this embodiment includes the following steps.

At step 701, a fourth communication node receives a radio frame including indication information sent by a first communication node.

Here, the first communication node and a third communication node perform joint transmission.

At step 702, the fourth communication node determines whether to compete for channel access according to the indication information.

In an embodiment, joint transmission means that the first communication node and the third communication node simultaneously send the radio frame to a second communication node.

In another embodiment, joint transmission means that the first communication node alone sends the radio frame to the second communication node.

In an implementation, the indication information includes first identifier information. The first identifier information is configured to indicate whether the radio frame is a joint transmission radio frame. Alternatively, the first identifier information is configured to indicate an identifier of the first communication node. Alternatively, the first identifier information is configured to indicate an identifier of joint transmission.

In the case that the first identifier information is configured to indicate whether the radio frame is a joint transmission radio frame, in step 702, in response to determining that the first identifier information indicates that the radio frame is a joint transmission radio frame, the fourth communication node does not compete for channel access after receiving the indication information.

In the case that the first identifier information is configured to indicate the identifier of the first communication node, in step 702, in response to the fourth communication node being a communication node associated with the first communication node, the fourth communication node does not compete for channel access after receiving the indication information; in response to the fourth communication node being a communication node associated with the third communication node, and the fourth communication node being not the target receiver of the radio frame, the fourth communication node does not compete for channel access after receiving the indication information; and in response to the fourth communication node being a communication node associated with neither the first communication node nor the third communication node, the fourth communication node competes for channel access after receiving the indication information.

In the case that the first identifier information is configured to indicate the identifier of joint transmission, in step 702, in response to the fourth communication node being a communication node associated with the communication node included in the identifier of joint transmission, the fourth communication node does not compete for channel access after receiving the indication information; and in response to the fourth communication node being a communication node not associated with the communication node included in the identifier of joint transmission, the fourth communication node competes for channel access after receiving the indication information.

In an implementation, after step 702, the fourth communication node enters a sleep mode.

In an implementation, a sleep duration of the fourth communication node is: a duration of the radio frame or a time period indicated in the radio frame.

In an implementation, in the case that the first identifier information is configured to indicate the identifier of the first communication node, the first identifier information is at least one of the following: a color of a BSS where the first communication node is located, an identifier of the BSS where the first communication node is located, a value generated according to the identifier of the BSS where the first communication node is located, an identifier of the first communication node itself, or a value generated according to the identifier of the first communication node itself.

In an implementation, in the case that the first identifier information is configured to indicate the identifier of joint transmission, the first identifier information is an exclusive identifier of joint transmission. Alternatively, the first identifier information is an identifier of a joint transmission group.

In another implementation, the indication information also includes second identifier information, and the second identifier information is configured to indicate an identifier of the third communication node and/or an identifier of the target receiver.

In an implementation, the second identifier information includes at least one of the following: a color of a BSS where the third communication node is located, an identifier of the BSS where the third communication node is located, a value generated according to the identifier of the BSS where the third communication node is located, an identifier of the third communication node itself, or a value generated according to the identifier of the third communication node itself.

The data transmission method provided by this embodiment includes: receiving, by a fourth communication node, a radio frame including indication information sent by a first communication node; and determining, by the fourth communication node, whether to compete for channel access according to the indication information. In a scenario of joint transmission by the first communication node and a third communication node, the fourth communication node other than a second communication node determines whether to compete for channel access according to the indication information after receiving the radio frame, so as to save the energy of the fourth communication node, avoid interfering with the reception of the radio frame by the second communication node, and improve the communication reliability of the second communication node.

Figure 8:
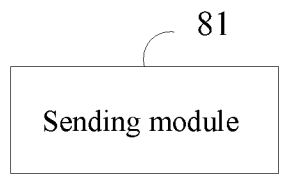
FIG. 8 is a schematic diagram of a data transmission apparatus provided by an embodiment.

FIG. 8 is a schematic diagram of a data transmission apparatus provided by an embodiment. The apparatus can be arranged in a first communication node. As shown in FIG. 8, the data transmission apparatus provided by this embodiment includes a sending module 81.

The sending module 81 is configured to send a radio frame including indication information to a second communication node.

Here, the second communication node is associated with a third communication node. The third communication node and the first communication node perform joint transmission. The indication information is configured to instruct a fourth communication node other than the second communication node, after receiving the radio frame, to determine whether to compete for channel access according to the indication information.

Figure 9:
FIG. 9 is a schematic diagram of a data transmission apparatus provided by another embodiment.

FIG. 9 is a schematic diagram of a data transmission apparatus provided by another embodiment. The apparatus can be arranged in a fourth communication node. As shown in FIG. 9, the data transmission apparatus provided by this embodiment includes: a receiving module 91 and a determining module 92.

The receiving module 91 is configured to receive a radio frame including indication information sent by a first communication node.

Here, the first communication node and a third communication node perform joint transmission.

The determining module 92 is configured to determine whether to compete for channel access according to the indication information.

In an embodiment, in the apparatuses shown in FIGS. 8 and 9, the indication information includes first identifier information. The first identifier information is configured to indicate whether the radio frame is a joint transmission radio frame. Alternatively, the first identifier information is configured to indicate an identifier of the first communication node. Alternatively, the first identifier information is configured to indicate an identifier of joint transmission.

In the case that the first identifier information is configured to indicate whether the radio frame is a joint transmission radio frame, the determining module 92 is configured in a way that in response to determining that the first identification information indicates that the radio frame is a joint transmission radio frame, the fourth communication node does not compete for channel access after receiving the indication information.

In the case that the first identifier information is configured to indicate the identifier of the first communication node, the first identifier information is at least one of the following: a color of a BSS where the first communication node is located, an identifier of the BSS where the first communication node is located, a value generated according to the identifier of the BSS where the first communication node is located, an identifier of the first communication node itself, or a value generated according to the identifier of the first communication node itself.

In this case, the determining module 92 is configured in a way that in response to the fourth communication node being a communication node associated with the first communication node, the fourth communication node does not compete for channel access after receiving the indication information; in response to the fourth communication node being a communication node associated with the third communication node, and the fourth communication node being not the receiver of the radio frame, the fourth communication node does not compete for channel access after receiving the indication information; and in response to the fourth communication node being a communication node associated with neither the first communication node nor the third communication node, the fourth communication node competes for channel access after receiving the indication information.

In the case that the first identifier information is configured to indicate the identifier of joint transmission, the first identifier information is an exclusive identifier of joint transmission. Alternatively, the first identifier information is an identifier of a joint transmission group.

In this case, the determining module 92 is configured in a way that in response to the fourth communication node being a communication node associated with the communication node included in the identifier of joint transmission, the fourth communication node does not compete for channel access after receiving the indication information; and in response to the fourth communication node being a communication node not associated with the communication node included in the identifier of joint transmission, the fourth communication node competes for channel access after receiving the indication information.

In an embodiment, in the apparatuses shown in FIGS. 8 and 9, the indication information also includes second identifier information. The second identifier information is configured to indicate an identifier of the third communication node and/or an identifier of a target receiver.

In an implementation, the second identifier information includes at least one of the following: a color of a BSS where the third communication node is located, an identifier of the BSS where the third communication node is located, a value generated according to the identifier of the BSS where the third communication node is located, an identifier of the third communication node itself, or a value generated according to the identifier of the third communication node itself. Here, the identifier of the third communication node itself includes at least one of the following: an MAC address of the third communication node, or a value generated according to the MAC address of the third communication node.

In an implementation, the data transmission apparatus shown in FIG. 9 further includes a sleep module configured to enter a sleep mode.

In an implementation, a sleep duration is: a duration of the radio frame or a time period indicated in the radio frame.

Joint transmission in this embodiment means that the first communication node and the third communication node simultaneously send the radio frame to a second communication node. Alternatively, joint transmission means that the first communication node alone sends the radio frame to the second communication node.

The data transmission apparatus provided by the embodiment shown in FIG. 8 is configured to implement the data transmission method of the embodiment shown in FIG. 3. The implementation principles and technical effects of the data transmission apparatus provided by this embodiment are similar to those of the data transmission method, which will not be repeated here.

The data transmission apparatus provided by the embodiment shown in FIG. 9 is configured to implement the data transmission method of the embodiment shown in FIG. 7. The implementation principles and technical effects of the data transmission apparatus provided by this embodiment are similar to those of the data transmission method, which will not be repeated here.

Figure 10:
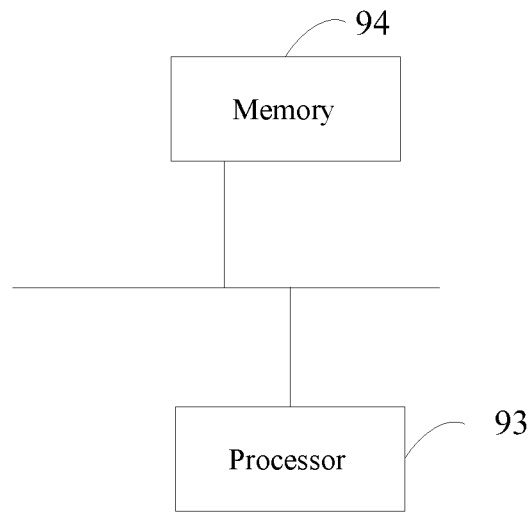
FIG. 10 is a schematic diagram of a data transmission apparatus provided by yet another embodiment.

FIG. 10 is a schematic diagram of a data transmission apparatus provided by yet another embodiment. As shown in FIG. 10, the data transmission apparatus includes a processor 93. In an implementation, the data transmission apparatus further includes a memory 94. There may be one or more processors 93 in the data transmission apparatus. One processor 93 is shown in FIG. 10 as an example. The processor 93 and the memory 94 in the data transmission apparatus can be connected by a bus or other means. Bus connection is taken as an example in FIG. 10.

As a computer readable storage medium, the memory 94 can be configured to store software programs, computer executable programs and modules, such as program instructions/modules corresponding to the data transmission methods in the embodiments of FIGS. 3 and 7 (for example, the sending module 81 in the data transmission apparatus, or the receiving module 91 and the determining module 92 in the data transmission apparatus). The processor 93 executes various functional applications and data processing of the data transmission apparatus by running the software programs, instructions and modules stored in the memory 94, that is, implements the data transmission method of FIG. 3 and example implementations thereof, or implements the data transmission method of FIG. 7 and example implementations thereof.

The memory 94 may mainly include a storage program area and a storage data area, where the storage program area may store an operating system and application program(s) required by at least one function, and the storage data area may store data created according to the use of the data transmission apparatus, etc. In addition, the memory 94 may include a high-speed random access memory and a non-volatile memory, for example, at least one magnetic disk storage device, a flash memory device, or another non-volatile solid-state storage device.

By way of example, the data transmission apparatus shown in FIG. 10 may be an AP or an STA in a WLAN. When the data transmission apparatus is an AP, the data transmission method of FIG. 3 and example implementations thereof are implemented. When the data transmission apparatus is an STA, the data transmission method of FIG. 7 and example implementations thereof are implemented.

A further embodiment of the present disclosure provides a storage medium containing computer-executable instructions which, when executed by a computer processor, cause the data transmission method according to any of the embodiments of the present disclosure to be performed.

The above-described embodiments are only example embodiments of the present disclosure, and are not intended to limit the scope of protection of the present disclosure.

Those having ordinary skill in the art should understand that the term "user terminal" covers any suitable type of wireless user equipment, such as mobile phones, portable data processing equipment, portable web browsers or vehicle-mounted mobile stations.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a mobile device executing computer program instructions, for example, in a processor entity, or by hardware, or by a combination of software and hardware. The computer program instructions may be assembly instructions, instruction set architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

By way of illustrative and non-limiting implementations, a detailed description of the embodiments of the present disclosure has been provided above. However, when considered in connection with the drawings and claims, it is obvious to those skilled in the art that various modifications and adjustments can be made to the above embodiments without departing from the scope of the present disclosure. Therefore, the appropriate scope of the present disclosure will be determined according to the claims.

The invention claimed is:

1. A data transmission method, comprising:
sending, by a first communication node, a radio frame comprising indication information to a second communication node, wherein the second communication node is associated with a third communication node, the third communication node and the first communication node perform joint transmission for the second communication node, and the indication information is configured to instruct a fourth communication node other than the second communication node, after receiving the radio frame, to determine whether to use spatial multiplexing technology for transmission according to the indication information, wherein the second communication node is a target receiver of the radio frame, and the fourth communication node is not the target receiver of the radio frame;
wherein the first communication node and the third communication node are access points (APs), and the second communication node and the fourth communication node are stations (STAs).

2. The method of claim 1, wherein:
the indication information comprises first identifier information; and
the first identifier information is configured to indicate one of:
whether the radio frame is a joint transmission radio frame;
an identifier of the first communication node; or
an identifier of joint transmission.

3. The method of claim 2, wherein in the case that the first identifier information is configured to indicate the identifier of the first communication node, the first identifier information comprises at least one of:
a color of a basic service set (BSS) where the first communication node is located,
an identifier of the BSS where the first communication node is located,
a value generated according to the identifier of the BSS where the first communication node is located,
an identifier of the first communication node, or
a value generated according to the identifier of the first communication node.

4. The method of claim 2, wherein in the case that the first identifier information is configured to indicate the identifier of joint transmission, the first identifier information comprises an exclusive identifier of joint transmission, or an identifier of a joint transmission group.

5. The method of claim 2, wherein the indication information further comprises second identifier information, and the second identifier information is configured to indicate at least one of: an identifier of the third communication node, or an identifier of the target receiver.

6. The method of claim 5, wherein the second identifier information comprises at least one of:
a color of a basic service set (BSS) where the third communication node is located,
an identifier of the BSS where the third communication node is located,
a value generated according to the identifier of the BSS where the third communication node is located,
an identifier of the third communication node, or
a value generated according to the identifier of the third communication node.

7. The method of claim 6, wherein the identifier of the third communication node comprises at least one of:
a media access control (MAC) address of the third communication node, or
a value generated according to the MAC address of the third communication node.

8. The method of claim 1, wherein:
the joint transmission means that the first communication node and the third communication node simultaneously send the radio frame to the second communication node; or,
the joint transmission means that the first communication node alone sends the radio frame to the second communication node.

9. A data transmission apparatus, comprising a processor, the processor being configured to implement the data transmission method of claim 1 when executing a computer program.

10. A non-transitory computer-readable storage medium storing a computer program which, when executed by a processor, causes the processor to implement the data transmission method of claim 1.

11. A data transmission method, comprising:
receiving, by a fourth communication node, a radio frame including indication information sent by a first communication node, wherein the first communication node and a third communication node perform joint transmission for a second communication node; and
determining, by the fourth communication node, whether to use spatial multiplexing technology for transmission according to the indication information, wherein the second communication node is a target receiver of the radio frame, and the fourth communication node is not the target receiver of the radio frame;
wherein the first communication node and the third communication node are access points (APs), and the second communication node and the fourth communication node are stations (STAs).

12. The method of claim 11, wherein:
the indication information comprises first identifier information; and
the first identifier information is configured to indicate one of:

whether the radio frame is a joint transmission radio frame,
an identifier of the first communication node, or
an identifier of joint transmission.

13. The method of claim 12, wherein in the case that the first identifier information is configured to indicate whether the radio frame is a joint transmission radio frame, the fourth communication node determining whether to use spatial multiplexing technology for transmission according to the indication information comprises:
in response to determining that the first identifier information indicates that the radio frame is a joint transmission radio frame, the fourth communication node determining not to use spatial multiplexing technology for transmission after receiving the indication information.

14. The method of claim 13, after determining not to use spatial multiplexing technology for transmission, further comprising:
the fourth communication node entering a sleep mode.

15. The method of claim 14, wherein a sleep duration of the fourth communication node is: a duration of the radio frame or a time period indicated in the radio frame.

16. The method of claim 12, wherein in the case that the first identifier information is configured to indicate the identifier of the first communication node, the fourth communication node determining whether to use spatial multiplexing technology for transmission according to the indication information comprises:
in response to determining that the fourth communication node is a communication node associated with the first communication node, the fourth communication node determining not to use spatial multiplexing technology for transmission after receiving the indication information;
in response to determining that the fourth communication node is a communication node associated with the third communication node and the fourth communication node is not the target receiver of the radio frame, the fourth communication node determining not to use spatial multiplexing technology for transmission after receiving the indication information; and
in response to determining that the fourth communication node is a communication node associated with neither the first communication node nor the third communication node, the fourth communication node determining to use spatial multiplexing technology for transmission after receiving the indication information.

17. The method of claim 12, wherein in the case that the first identifier information is configured to indicate the identifier of joint transmission, the fourth communication node determining whether to use spatial multiplexing technology for transmission according to the indication information comprises:
in response to determining that the fourth communication node is a communication node associated with communication nodes comprised by the identifier of joint transmission, the fourth communication node determining not to use spatial multiplexing technology for transmission after receiving the indication information; and
in response to determining that the fourth communication node is a communication node not associated with the communication nodes comprised by the identifier of joint transmission, the fourth communication node determining to use spatial multiplexing technology for transmission after receiving the indication information.

18. The method of claim 11, wherein:
the joint transmission means that the first communication node and the third communication node simultaneously send the radio frame to the second communication node; or,
the joint transmission means that the first communication node alone sends the radio frame to the second communication node.

19. A data transmission apparatus, comprising a processor, the processor being configured to implement the data transmission method of claim 11 when executing a computer program.

20. A non-transitory computer-readable storage medium storing a computer program which, when executed by a processor, causes the processor to implement the data transmission method of claim 11.

* * * * *